US006628039B2

(12) United States Patent
Dhuler

(10) Patent No.: US 6,628,039 B2
(45) Date of Patent: Sep. 30, 2003

(54) MICROELECTROMECHANICAL DEVICE HAVING SINGLE CRYSTALLINE COMPONENTS AND METALLIC COMPONENTS

(75) Inventor: Vijayakumar R. Dhuler, Raleigh, NC (US)

(73) Assignee: Memscap, S.A. (FR)

( * ) Notice: Subject to any disclaimer, the term of this patent is extended or adjusted under 35 U.S.C. 154(b) by 0 days.

(21) Appl. No.: 09/891,700

(22) Filed: Jun. 26, 2001

(65) Prior Publication Data

US 2001/0038254 A1 Nov. 8, 2001

Related U.S. Application Data

(63) Continuation of application No. 09/383,053, filed on Aug. 25, 1999, now Pat. No. 6,291,922.

(51) Int. Cl.[7] .................................................. H02N 10/00

(52) U.S. Cl. ......................... 310/306; 310/307; 361/164

(58) Field of Search ................................ 310/306, 307, 310/309; 361/160, 161, 162, 163, 164

(56) References Cited

U.S. PATENT DOCUMENTS

| | | | |
|---|---|---|---|
| 1,258,368 A | 3/1918 | Smith | 310/307 |
| 1,658,669 A | 2/1928 | Cohn et al. | 310/306 |
| 3,213,318 A | 10/1965 | Glenn | 310/306 |
| 3,609,593 A | 9/1971 | Bell et al. | 331/156 |
| 4,806,815 A | 2/1989 | Honna | 310/307 |
| 5,179,499 A | 1/1993 | MacDonald et al. | 361/313 |
| 5,184,269 A | 2/1993 | Shimada et al. | 361/24 |
| 5,261,747 A | 11/1993 | Deacutis et al. | 374/137 |

(List continued on next page.)

FOREIGN PATENT DOCUMENTS

| | | |
|---|---|---|
| DE | 38 09 597 | 10/1989 |
| DE | 42 05 029 | 2/1993 |
| EP | 0 469 749 | 2/1992 |
| EP | 0 478 956 | 4/1992 |
| EP | 0665 950 | 8/1995 |
| FR | 764821 | 3/1934 |
| GB | 792145 | 3/1958 |
| WO | WO 99/16096 | 4/1999 |

OTHER PUBLICATIONS

Klaassen E. H. et al: "Silicon Fusion Bonding and Deep Reactive Ion Etching: A New Technology for Microstructures" *Sensors and Actuators A*, vol. 52, No. 1/03, Mar. 1996, pp. 132–139.

Phipps, Thesis: "Design and Development of Microswitches for Micro–Electro–Mechanical Relay Matrices," Air Force Inst. Of Tech., Wright–Patterson AFB, OH School of Engineering, 1995.

(List continued on next page.)

*Primary Examiner*—Dang Le
(74) *Attorney, Agent, or Firm*—Myers Bigel Sibley & Sajovec

(57) ABSTRACT

A microelectromechanical (MEMS) device is provided that includes a microelectronic substrate, a microactuator disposed on the substrate and formed of a single crystalline material, and at least one metallic structure disposed on the substrate adjacent the microactuator While the MEMS device can include various microactuators, one embodiment of the microactuator is a thermally actuated microactuator that may include a pair of spaced apart supports disposed on the substrate and at least one arched beam extending therebetween. Thus, on actuation, the microactuator moves between a first position in which the microactuator is spaced apart from the at least one metallic structure to a second position in which the microactuator operably engages the at least one metallic structure.

14 Claims, 7 Drawing Sheets

U.S. PATENT DOCUMENTS

| | | | | | |
|---|---|---|---|---|---|
| 5,309,056 | A | | 5/1994 | Culp | 310/306 |
| 5,316,979 | A | | 5/1994 | MacDonald et al. | 437/203 |
| 5,355,712 | A | | 10/1994 | Peterson et al. | 73/4 R |
| 5,367,584 | A | | 11/1994 | Ghezzo et al. | 385/17 |
| 5,441,343 | A | | 8/1995 | Pylkki et al. | 374/137 |
| 5,467,068 | A | | 11/1995 | Field et al. | 335/4 |
| 5,475,318 | A | | 12/1995 | Marcus et al. | 324/762 |
| 5,483,799 | A | | 1/1996 | Dalto | 62/3.7 |
| 5,536,988 | A | | 7/1996 | Zhang et al. | 310/309 |
| 5,558,304 | A | | 9/1996 | Adams | 244/134 A |
| 5,600,174 | A | | 2/1997 | Reay et al. | 257/467 |
| 5,602,955 | A | | 2/1997 | Haake | 385/136 |
| 5,606,635 | A | | 2/1997 | Haake | 385/53 |
| 5,629,665 | A | | 5/1997 | Kaufmann et al. | 338/18 |
| 5,644,177 | A | | 7/1997 | Guckel et al. | 310/40 MM |
| 5,659,285 | A | | 8/1997 | Takeda | 337/389 |
| 5,722,989 | A | | 3/1998 | Fitch | 606/205 |
| 5,726,073 | A | | 3/1998 | Zhang et al. | 437/228 |
| 5,796,152 | A | | 8/1998 | Carr et al. | 257/415 |
| 5,813,441 | A | | 9/1998 | Dewispelaere | 139/455 |
| 5,862,003 | A | | 1/1999 | Saif et al. | 359/871 |
| 5,881,198 | A | * | 3/1999 | Haake | 385/136 |
| 5,909,078 | A | | 6/1999 | Wood et al. | 310/307 |
| 5,955,817 | A | | 9/1999 | Dhuler et al. | 320/307 |
| 5,994,816 | A | | 11/1999 | Dhuler et al. | 310/307 |
| 6,137,206 | A | | 10/2000 | Hill | 310/306 |
| 6,183,097 | B1 | * | 2/2001 | Saif et al. | 359/871 |
| 6,291,922 | B1 | * | 9/2001 | Dhuler | 310/307 |

OTHER PUBLICATIONS

Yamagata, et al., "A Micro Mobile Mechanism Using Thermal Expansion and Its Theoretical Analysis–A Comparison with Impact Drive Mechanism Using Piezoelectric Elements," *Proceedings of the IEEE Micro Electro Mechanical Systems*, 1994, pp. 142–147.

Oh, et al. "Thin Film Heater on a Thermally Isolated Microstructure," *Smart Materials Fabrication and Materials for Micro–Electro–Mechanical Systems*, 1992, pp. 277–282.

Safranek, "The Properties of Electrodeposited Metals & Alloys," *Amer. Electroplaters & Surface Finishers Society*, 1986, pp. 295–315.

Klassen, et al., Silicon Fusion Bonding and Deep Reactive Ion Etching; A new Technology for.

Microstructures, *Transducers '95—Eurosensors IX*, the 8th International Conference on Solid State Sensors and Actuators, and Eurosensors IX, Stockholm, Sweden, Jun. 25–29, 1995, pp. 556–559.

Noworolski et al., "Fabrication of SOI Wafers with Buried Cavities Using Silicon Fusion bonding and Electrochemical Etchback," *Transducers '95—Eurosensors IX*, The 8th International C'onference on Solid State Sensors and Actuators, and Eurosensors IX, Stockholm, Sweden, Jun. 25–29, 1995, pp. 71–74.

*Single Crystal Silicon Actuators and Sensors Based on Silicon Fusion Bonding Technology, Semiannual Progress Report 1, Advanced Research Projects Agency, Lucas NovaSensor, Contract No. DAAL 01–94–C–3411*, Apr.–Jul. 1994.

*Single Crystal Silicon Actuators and Sensors Based on Silicon Fusion Bonding Technology, Semiannual Progress Report 2, Advanced Research Projects Agency, Lucas NovaSensor, Contract No. DAAL 01–94–C–3411*, Jul. 1994–Jan. 1995.

*Single Crystal Silicon Actuators and Sensors Based on Silicon Fusion Bonding Technology, Semiannual Progress Report, Advanced Research Projects Agency, Lucas NovaSensor, Contract No. DAAL 01–94–C–3411*, Jan.–Jul. 1995.

*Single Crystal Silicon Actuators and Sensors Based on Silicon Fusion Bonding Technology, Semiannual Progress Report, Advanced Research Projects Agency, Lucas NovaSensor, Contract No. DAAL 01–94–C–3411*, Jan.–Aug. 1996.

J.W. Judy et al., *Surface Micromachined Linear Thermal Microactuator, International Electron Devices Meeting 1990, Technical Digest* (*CAT. No. 90CH2865–4*), Dec. 1990, New York, New York, pp. 629–632.

Fedder et al., *Multimode Digital Control of a Suspended Polysilicon Microstructure, Journal of Microelectromechanical Systems*, Dec. 1986, vol. 5, No. 4, pp. 283–297.

Comtois et al., *Applications for Surface–Micromachined Polysilicon thermal Actuators and Arrays, Sensors and Actuators*, Jan. 1997, vol. 58, No. 1, pp. 19–25.

Lin et al., *Vertically Driven Microactuators by Electrothermal Buckling Effects, Sensors and Actuators*, Nov. 1998, vol. 17, Nos. 1–2, pp. 35–39.

* cited by examiner

MICROELECTROMECHANICAL DEVICE HAVING SINGLE CRYSTALLINE COMPONENTS AND METALLIC COMPONENTS

RELATED APPLICATIONS

The present application is a continuation of U.S. patent application Ser. No. 09/383,053, filed Aug. 25, 1999 and entitled MICROELECTROMECHANICAL DEVICE HAVING SINGLE CRYSTALLINE COMPONENTS AND METALLIC COMPONENTS, now U.S. Pat. No. 6,291,922.

FIELD OF THE INVENTION

The present invention relates to microelectromechanical devices and associated fabrication methods and, more particularly, to microelectromechanical devices having both single crystalline components and metallic components as well as the associated fabrication methods.

BACKGROUND OF THE INVENTION

Microelectromechanical structures (MEMS) and other microengineered devices are presently being developed for a wide variety of applications in view of the size, cost and reliability advantages provided by these devices. Many different varieties of MEMS devices have been created, including microgears, micromotors, and other micromachined devices that are capable of motion or applying force. These MEMS devices can be employed in a variety of applications including hydraulic applications in which MEMS pumps or valves are utilized, optical applications which include MEMS light valves and shutters, and electrical applications which include MEMS relays.

MEMS devices have relied upon various techniques to provide the force necessary to cause the desired motion within these microstructures. For example, electrostatic actuators have been used to actuate MEMS devices. See, for example, U.S. patent application Ser. No. 09/320,891, assigned to MCNC, also the assignee of the present invention, which describes MEMS devices having electrostatic microactuators, the contents of which are incorporated herein by reference. In addition, controlled thermal expansion of an actuator or other MEMS component is another example of a technique for providing the necessary force to cause the desired motion within MEMS structures. See, for example, U.S. Pat. No. 5,909,078 and U.S. patent application Ser. Nos. 08/936,598; and 08/965,277, assigned to MCNC, also the assignee of the present invention, which describe MEMS devices having thermally actuated microactuators, the contents of which are incorporated herein by reference.

An example of a thermally actuated microactuator for a MEMS device comprises one or more arched beams extending between a pair of spaced apart supports. Thermal actuation of the microactuator causes further arching of the arched beams which results in useable mechanical force and displacement. The arched beams are generally formed from nickel using a high aspect ratio lithography technique which produces arched beams with aspect ratios up to 5:1. Although formed with high aspect ratio lithography, the actual nickel arched beams have rather modest aspect ratios and may therefore have less out-of-plane stiffness and be less robust than desired in some instances. Further, the lithography technique used to form nickel arched beams may result in the arched beams being spaced fairly far apart, thereby increasing the power required to heat the arched beams by limiting the amount that adjacent arched beams heat one another. In addition, the resulting microactuator may have a larger footprint than desired as a result of the spacing of the arched beams. Thus, there exists a need for arched beams having higher aspect ratios in order to increase the out-of-plane stiffness and the robustness of microactuators for MEMS devices. In addition, there is a desire for microactuators having more closely spaced arched beams to enable more efficient heating and a reduced size.

Nickel microactuators are typically heated indirectly, such as via a polysilicon heater disposed adjacent and underneath the actuator, since direct heating of the nickel structure (such as by passing a current therethrough) is inefficient due to the low resistivity of nickel. However, indirect heating of the microactuator of a MEMS device results in inefficiencies since not all heat is transferred to the microactuator due to the necessary spacing between the microactuator and the heater which causes some of the heat generated by the heater to be lost to the surroundings.

Nickel does have a relatively large coefficient of thermal expansion that facilitates expansion of the arched beams. However, significant energy must still be supplied to generate the heat necessary to cause the desired arching of the nickel arched beams due to the density thereof. As such, although MEMS devices having microactuators with nickel arched beams provide a significant advance over prior actuation techniques, it would still be desirable to develop MEMS devices having microactuators that could be thermally actuated in a more efficient manner in order to limit the requisite input power requirements.

SUMMARY OF THE INVENTION

The above and other needs are met by the present invention which, in a preferred embodiment, provides a microelectromechanical device comprising a microelectronic substrate, a microactuator disposed thereon and comprised of a single crystalline material, such as silicon, and at least one metallic structure disposed on the substrate in a spaced relationship from the microactuator and preferably in the same plane as the microactuator such that the microactuator can contact the metallic structure upon thermal actuation thereof. In particular, actuation of the microactuator causes said at least one metallic structure to be engaged and moved as a result of the operable contact with the microactuator. In one advantageous embodiment, the MEMS device may include two adjacent metal structures with one of the metallic structures being fixed and the other metallic structure being moveable. In this embodiment, the MEMS device may be a microrelay such that actuation of the microactuator brings the microactuator into operable contact with the moveable metallic structure, thereby permitting the metallic structures to be selectively brought into contact in response to actuation of the microactuator.

According to one advantageous embodiment, the microactuator is thermally actuated. In this embodiment, the microactuator preferably comprises a pair of spaced apart supports disposed on the substrate and at least one arched beam extending therebetween. The microactuator may also include an actuator member that is operably coupled to the at least one arched beam and extends outwardly therefrom. The microactuator further includes means for heating said at least one arched beam to cause further arching thereof, wherein the actuator member moves between a first position in which the actuator member is spaced apart from said at least one metallic structure and a second position in which the actuator member operably engages said at least one metallic structure.

In another embodiment of the present invention, the microactuator is electrostatically actuated. In this embodiment, an electrostatic microactuator may comprise, for instance, a microelectronic substrate having at least one stator disposed thereon. Preferably, the stator has a plurality of fingers protruding laterally therefrom. Further, the electrostatic microactuator includes at least one shuttle disposed adjacent the stator, wherein the shuttle is movable with respect to the substrate and has a plurality of fingers protruding laterally therefrom. The fingers protruding from the shuttle are preferably interdigitated with the fingers protruding from the stator. An actuator member is coupled to the shuttle, protrudes outwardly therefrom, and extends between a pair of spaced apart supports. Electrical biasing of the stator with respect to the shuttle causes movement of the shuttle such that the actuator member operably engages the metallic structure in response to the actuation of the electrostatic actuator.

Another advantageous aspect of the present invention comprises the associated method to form a microelectromechanical device having both single crystal components and metallic components. According to one preferred method, a microactuator, such as a thermally actuated microactuator or an electrostatic microactuator, is formed from a wafer comprised of a single crystalline material. At least one metallic structure is also formed upon a surface of a substrate such that at least one metallic structure is moveable relative to the substrate. The microactuator is then bonded upon the surface of the substrate such that portions of the microactuator are also moveable relative to the substrate in order that the microactuator may operably engage the metallic structure in response to thermal actuation thereof.

An alternative method of fabricating a microelectromechanical device having both single crystal components and metallic components in accordance with a preferred embodiment of the present invention comprises bonding a wafer comprised of a single crystalline material upon a surface of a substrate. After polishing the wafer to the desired configuration, at least one window may be defined through the wafer, extending to the substrate. Using the wafer as a template, at least one metallic structure may then be formed within said at least one window defined by the wafer and upon the surface of the substrate. A portion of the wafer surrounding the at least one metallic structure can then be etched away to permit the metallic structure to be moveable relative to the substrate. Either before or after the metallic structure is formed, a microactuator is formed from the wafer such that portions of the microactuator are moveable relative to the substrate and are capable of operably engaging the metallic structure in response to thermal actuation thereof.

Yet another alternative method of fabricating a microelectromechanical device having both single crystal components and metallic components in accordance with a preferred embodiment of the present invention comprises bonding a wafer comprised of a single crystalline material upon a surface of a substrate. After polishing the wafer to the desired configuration, a portion of the wafer can be etched away and at least one metallic structure formed upon the surface of the substrate such that the metallic structure is moveable relative to the substrate. Either before or after the metallic structure is formed, a microactuator is formed from the wafer such that portions of the microactuator are moveable relative to the substrate and are capable of operably engaging the metallic structure in response to thermal actuation thereof.

Thus, a MEMS device, such as a microrelay, can be formed in accordance with the present invention that includes actuators formed of single crystalline silicon, while other components of the MEMS device are formed of metal, such as nickel. Fabricating, for example, the arched beams of a thermally actuated microactuator or the interdigitated fingers of an electrostatic microactuator from single crystalline silicon allows the features to be formed with aspect ratios of up to at least 10:1, particularly by using a deep reactive ion etching process. The higher aspect ratios of the features and components increases their out-of-plane stiffness and constructs a more robust device. The fabrication techniques of the present invention also advantageously permit closer spacing of features and components. For example, the closer spacing between adjacent silicon arched beams of a thermally actuated microactuator results in more effective transfer of heat between adjacent arched beams. In addition, the single crystalline silicon microactuator can be directly heated, such as by passing a current therethrough. As will be apparent, direct heating of the microactuator is generally more efficient than indirect heating. Further, although the coefficient of thermal expansion of silicon is less than that of metals, such as nickel, silicon is significantly less dense than nickel such that for a given amount of power a silicon arched beam can generally be heated more than a corresponding nickel arched beam. Therefore, the MEMS device of the present invention can have greater out-of-plane stiffness, can be more robust and can be more efficiently heated than conventional MEMS microactuators having metallic components.

BRIEF DESCRIPTION OF THE DRAWINGS

Some of the advantages of the present invention having been stated, others will appear as the description proceeds, when considered in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
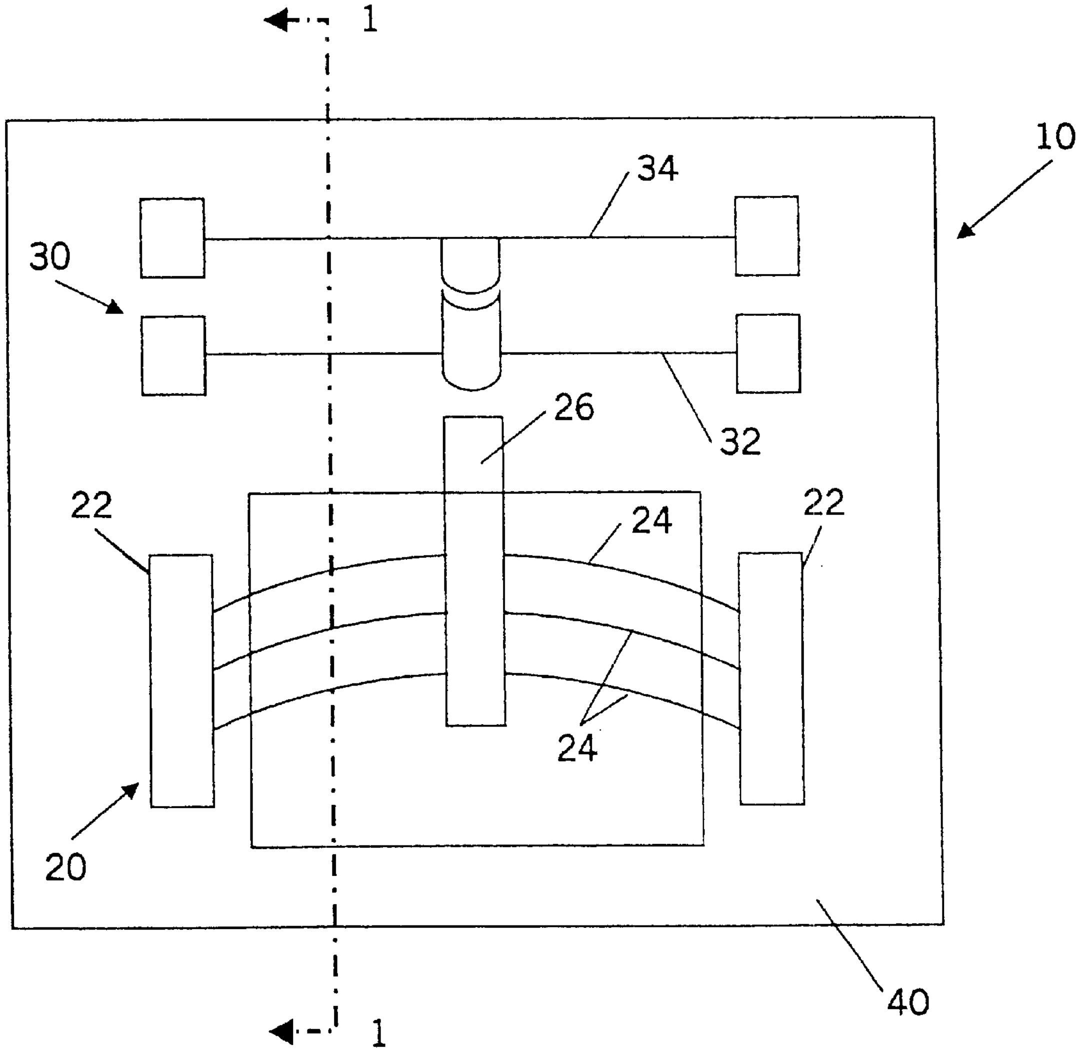
FIG. 1 is a plan view of a MEMS device and, in particular, a microrelay, in accordance with one embodiment of the present invention.

FIG. 1 discloses an embodiment of a MEMS device and, in particular, a microrelay, indicated generally by the numeral 10, which includes the features of the present invention. The microrelay 10 generally comprises a microactuator 20 and at least one adjacent metallic structure 30. While the substrate 40 can be formed of a variety of materials, the substrate 40 preferably comprises a wafer of a single crystalline material such as silicon. Although the microactuator can have various forms as is further described herein, the microactuator 20 of one advantageous embodiment is thermally actuated and includes a pair of spaced apart supports 22 affixed to the substrate 40 and at least one and, more preferably, a number of arched beams 24 extending between the spaced apart supports 22. According to the present invention, the supports 22 and the arched beams 24 are preferably formed of a single crystalline material, such as single crystalline silicon, and, more preferably, as a unitary structure formed from the same single crystalline silicon wafer.

According to one advantageous aspect of the present invention, the arched beams 24 are comprised of single crystal silicon which has a relatively low coefficient of thermal expansion of $2.5\times10^{-6}/°$ K, which is about one-fifth that of nickel. Surprisingly, however, silicon arched beams generally require less energy to heat to the same temperature as compared to nickel arched beams of the same size and shape. The reduction in energy required to heat the silicon arched beams results, in part, from the density of silicon of 2.33 $g/cm^3$ that is only about one-fourth that of nickel. In addition, silicon arched beams can be directly heated that provides more efficient heating than the indirect heating typically used for nickel arched beams.

Another advantage of silicon arched beams 24 is that a high aspect ratio lithography process (which currently limits the aspect ratio of nickel arched beams to 5:1) is not required. Instead, a deep reactive ion etching process is used in the formation of silicon arched beams, wherein this etching process can routinely produce aspect ratios of 10:1. The high aspect ratios for silicon arched beams increases the out-of-plane stiffness of the arched beams and contributes to more robust devices. In addition, the deep reactive ion etching process permits the arched beams to be more closely spaced than nickel arched beams, thus increasing the energy efficiency of the microactuator 20 due to heat transfer between adjacent silicon arched beams. For example, the silicon arched beams of the MEMS device of the present invention having an aspect ratio of 10:1 can have a center-to-center spacing of 10 μm and a gap between adjacent arched beams of 5 μm. For the foregoing reasons, a microactuator having silicon arched beams is therefore much more efficiently heated than conventional microactuators with nickel arched beams since the beams may be placed in closer proximity to adjacent beams. For instance, in one embodiment, a 40% reduction in the energy required to heat the silicon arched beams is obtained by reducing the configuration of silicon arched beams having a 10:1 aspect ratio from a center-to-center spacing of 22 μm with a 12 μm gap between adjacent arched beams to a center-to-center spacing of 10 μm with a 5 μm gap between adjacent arched beam.

The microactuator 20 also includes means for heating the arched beams 24. In one embodiment of the present invention, the microactuator 20 is thermally actuated by direct heating of the arched beams 24. For example, a potential difference can be applied between electrodes disposed upon the spaced apart supports 22 which causes a current to flow through the arched beams 24. The resistivity of the arched beams 24 causes heat to be produced in the arched beams 24 due to the current, thereby providing the necessary thermal actuation. Alternatively, the arched beams 24 can be indirectly heated to produce the thermal actuation of the microactuator 20 such as, for example, by a change in the ambient temperature about the arched beams 24 or by an external polysilicon heater disposed adjacent thereto. As shown in FIG. 1, the arched beams 24 are arched in a direction which preferably extends parallel to the substrate in the desired or predetermined direction of motion of the microactuator 20. Thus, heating of the arched beams 24 causes further arching thereof in the predetermined direction, thereby resulting in useable displacement and mechanical force.

The microactuator 20 may also include a lengthwise extending actuator member 26 coupled to the arched beams 24 and extending outwardly therefrom in the direction of motion. The actuator member 26 therefore serves as a coupler to mechanically couple a plurality of arched beams 24 between the spaced apart supports 22 as shown in FIG. 1. As such, further arching of the arched beams 24 in the predetermined direction displaces the actuator member 26 in the same predetermined direction. By mechanically coupling multiple arched beams with the actuator member 26, the resulting microactuator 20 provides a higher degree of controlled displacement and force than would be provided by a single arched beam.

As further shown in FIG. 1, the microactuator 20 of the present invention is preferably designed to actuate at least one metallic structure 30 disposed adjacent the microactuator 20 and in the same plane as the microactuator. As also shown, the at least one metallic structure 30 can include two metallic structures 32 and 34 with one of the metallic structures 32 being moveable while the other metallic structure 34 is either moveable or fixed relative to the substrate. Although the metallic structures can be formed in different manners, the metallic structures of the illustrated embodiment each include a metallic member suspended by means of a pair of tethers from respective anchors. While the anchors are affixed to the substrate, the metallic members can move relative to the substrate. Although not necessary for the practice of the present invention, the faces of the metallic members may have complimentary shapes to facilitate mating of the metallic members. The actuator member 26, in a non-actuated or ambient state, may be either spaced apart from or touching the moveable metallic structure 32. Upon thermal actuation of the microactuator 20, such as by direct heating of the arched beams 24, however, the actuator member 26 is preferably urged into engagement with the moveable metallic structure 32. Since the metallic structure 32 is moveable relative to the substrate, further actuation of the microactuator 20 will urge the moveable metallic structure 32 into contact with the other metallic structure 34. As such, the MEMS device of this embodiment may serve as a microrelay by controllably establishing contact between the first and second metallic members that form the pair of electrical contacts of the microrelay. By appropriately electrically connecting respective circuits or the like to the first and second metallic structures, the circuits can be controllably connected by selectively thermally actuating the microactuator.

As described below, the metallic structures 30 are typically formed on a substrate 40 which may be comprised of a variety of materials, such as silicon, glass, or quartz. The metallic structures 30 are preferably formed of metal, such as nickel, that is deposited on the substrate 40 in the same plane as the microactuator by means of an electroplating process. The metallic structures 30 are typically separated from the substrate 40 by a release layer (not shown). By removing the release layer after forming the metallic structure, such as by wet etching the release layer, the metallic structure is then capable of movement with respect to the substrate 40.

In accordance with the present invention, several associated methods may be used to produce the MEMS device, such as a microrelay 10, having both single crystal components and metallic components. The associated methods described herein disclose the fabrication steps related to one embodiment of a thermally actuated microactuator in the production of a MEMS device. It will be appreciated by those skilled in the art that the fabrication steps herein described are also applicable (with appropriate modifications) to various other microactuators, such as electrostatic microactuators, comprised of a single crystalline material, such as a single crystalline silicon. Thus, it is understood that the associated methods as described herein may be used to produce MEMS devices having both metallic components and single crystal components, including various types of single crystalline microactuators, such as thermally actuated microactuators and electrostatic microactuators.

As shown in FIG. 2 and according to one advantageous method, at least one metallic structure 30 may be formed on one wafer while the silicon microactuator components may be fabricated from another wafer. Once the structures are formed, the two wafers are bonded together, for example, by an anodic bonding process or another type of low temperature bonding, such as eutectic bonding.

More particularly, the microactuator 20 is formed by etching the components, such as the supports and arched beams, from a single crystalline silicon wafer. In contrast, the said at least one metallic structure 30 is formed by electroplating a metal, such as nickel, on another wafer, which may be comprised, for instance, of silicon or quartz. The two wafers are then bonded together such that the microactuator 20 is disposed adjacent the metal structures 30 and is capable of engagement therewith. The wafer from which the microactuator 20 is formed is then polished back or etched to release at least some of the silicon components, and, more particularly, to allow the arched beams 24 to be moveable relative to the substrate.

Figure 2A:
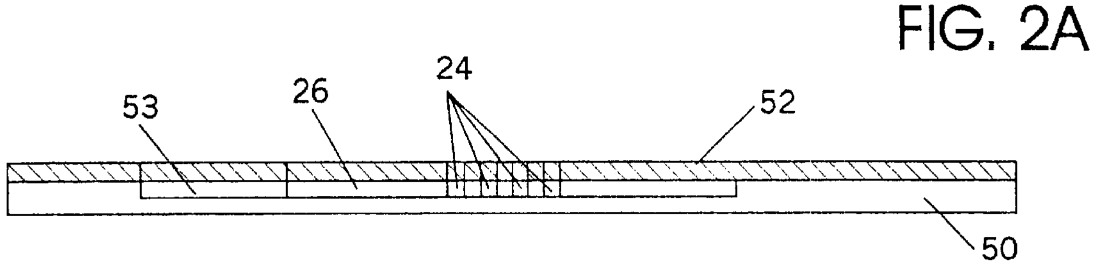
FIGS. 2A–2E are cross-sectional views illustrating a sequence of operations performed during the fabrication of a MEMS device, such as a microrelay, according to an embodiment of the present invention.

As shown in more detail in FIG. 2A, a microactuator 20 may be formed from a single crystalline silicon wafer by initially depositing a mask layer 52 upon a single crystalline silicon wafer substrate 50. It will be understood by those having skill in the art that when a layer or element is described herein as being "on" another layer or element, it may be formed directly on the layer, at the top, bottom or side surface area, or one or more intervening layers may be provided between the layers. The mask layer 52 is typically a photoresist or a light sensitive polymer material. Once deposited upon the wafer 50, the mask layer 52 is patterned such that the photoresist which remains on the wafer 50 defines a cavity 53 (that will receive the metallic components as described hereinbelow) and the microactuator 20, generally comprised of a pair of spaced apart supports 22, at least one arched beam 24, and an actuator member 26. Once the photoresist is patterned, the wafer 50 is etched so as to form the microactuator structure 20 and the cavity 53. Preferably, the wafer 50 is etched by deep reactive ion etching capable of forming thin silicon structures from the wafer 50 having aspect ratios on the order of 10:1. The high aspect ratios for silicon arched beams increases the out-of-plane stiffness of the structures and contributes to more robust devices. In addition, deep reactive ion etching allows closer spacing of the silicon arched beams, such as a center-to-center spacing of 10 $\mu$m, thus increasing the efficiency with which the arched beams are heated due to increased heat transfer between adjacent silicon arched beams.

Figure 2B:
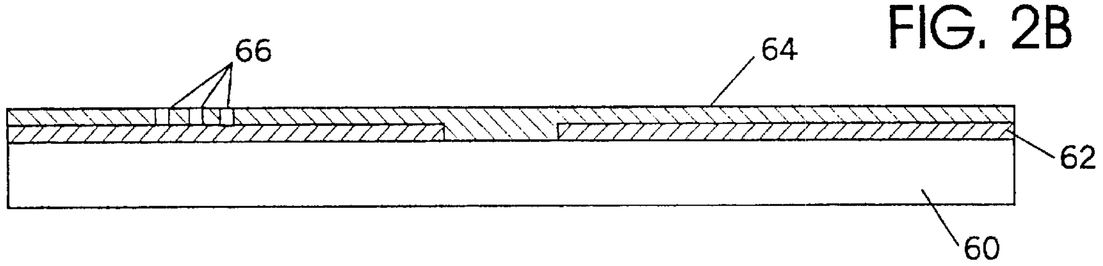
Figure 2C:
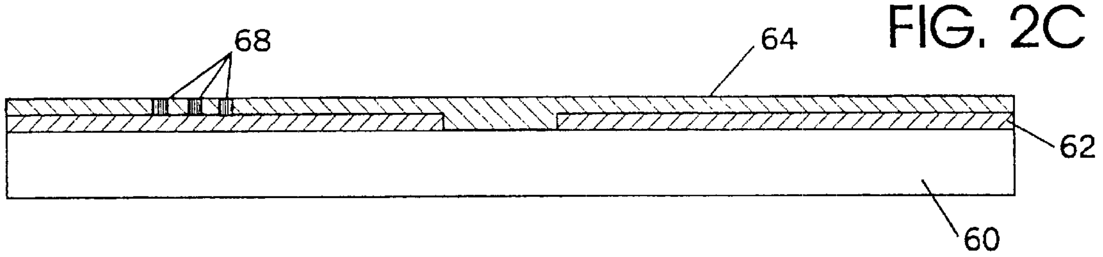

In order to fabricate said at least one metallic structure 30, a sacrificial plating base 62 is deposited on a separate substrate 60 as shown in FIG. 2B. The sacrificial plating base 62 can be any of a variety of plating bases known to those skilled in the art, such as a three-layer structure formed of titanium (adjacent the substrate), copper, and titanium or a three-layer structure formed of titanium (adjacent the substrate), copper, and titanium where chromium portions are deposited adjacent the substrate in selective locations instead of titanium. The chromium portions of the plating base 62 define areas in which components are not released from the substrate, and may be used, for example, in the plating base 62 underlying the anchors for the metallic structures 30. Following deposition of the plating base 62, a thick layer of photoresist 64 is deposited and lithographically patterned to open a number of windows 66 to the sacrificial plating base 62. The windows 66 opened within the photoresist 64 correspond to and define said at least one metallic structure 30, comprising, for example, the contacts of a microrelay. Thereafter, a metal 68, such as nickel, copper, or gold, is electroplated within the windows 66 defined by the photoresist 64 to produce the metallic structure 30 shown in FIG. 2C. Although any of a variety of metals that are capable of being electroplated can be utilized, nickel is particularly advantageous since nickel can be deposited with low internal stress in order to further stiffen the resulting structure to out-of-plane deflection. Electroplating of nickel layers with low internal stress is described in "The Properties of Electrodeposited Metals and Alloys," H. W. Sapraner, *American Electroplaters and Surface Technology Society,* pp. 295–315 (1986), the contents of which are incorporated herein by reference.

Figure 2D:
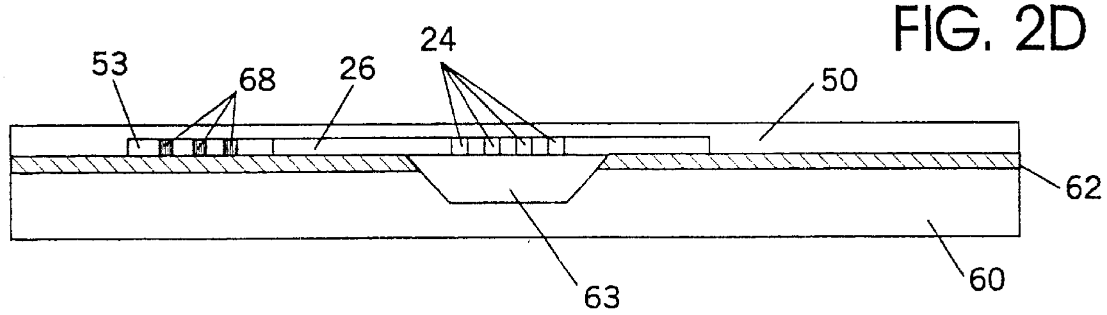
Figure 2E:
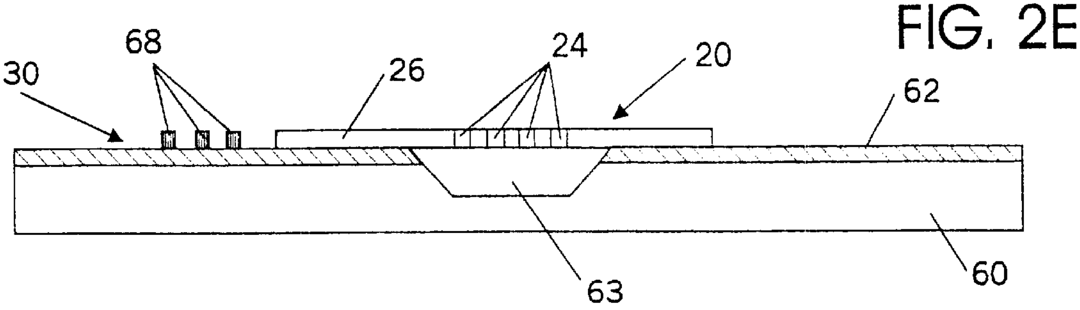
Figure 3A:
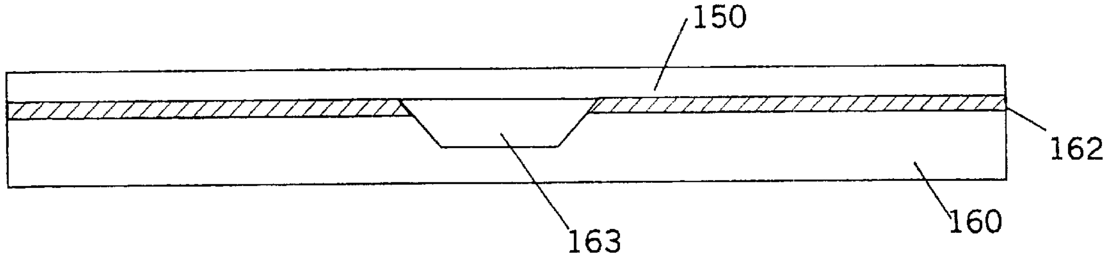
FIGS. 3A–3F are cross-sectional views illustrating an alternate sequence of operations performed during the fabrication of a MEMS device, such as a microrelay, according to another embodiment of the present invention.
Figure 3B:
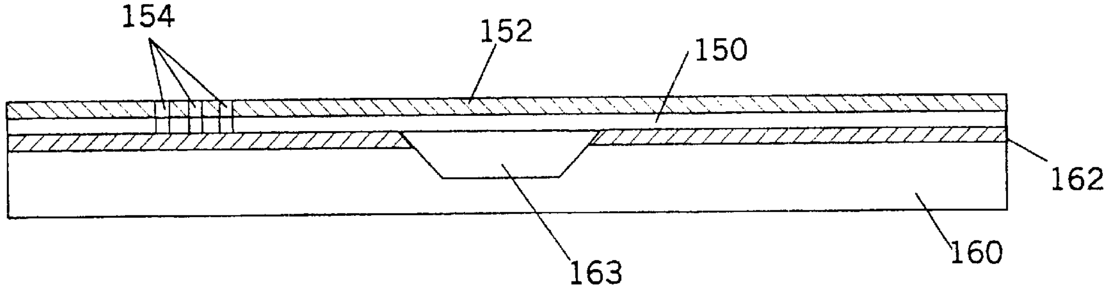
Figure 3C:
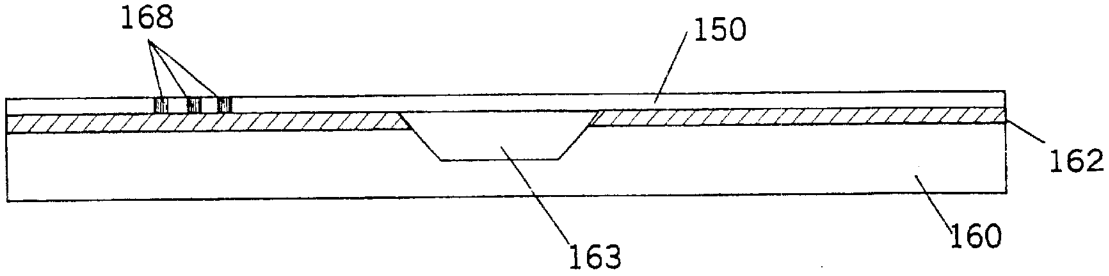
Figure 3D:
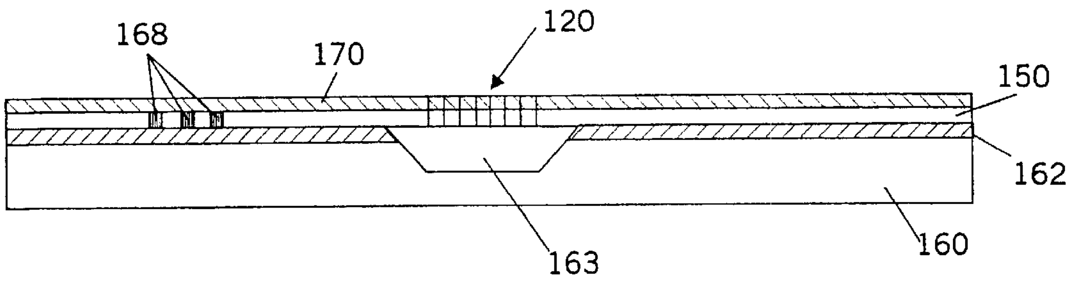
Figure 3E:
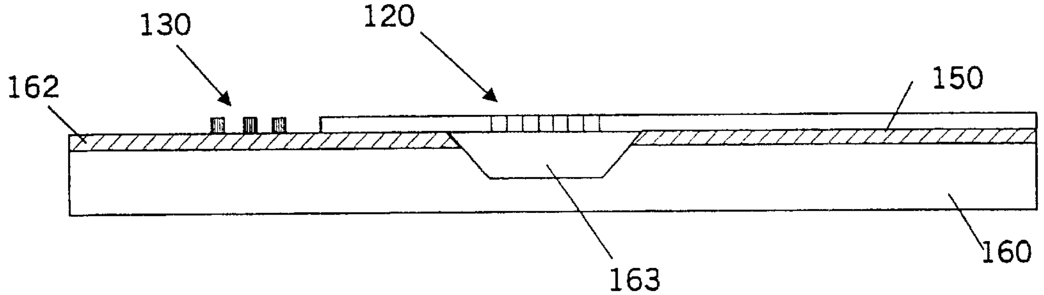
Figure 3F:
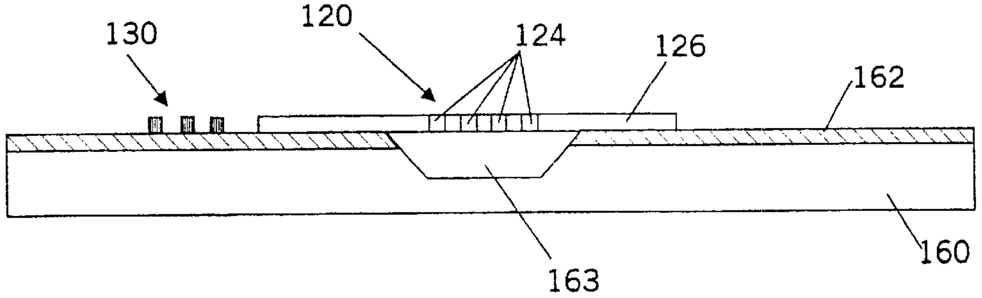
Figure 4A:
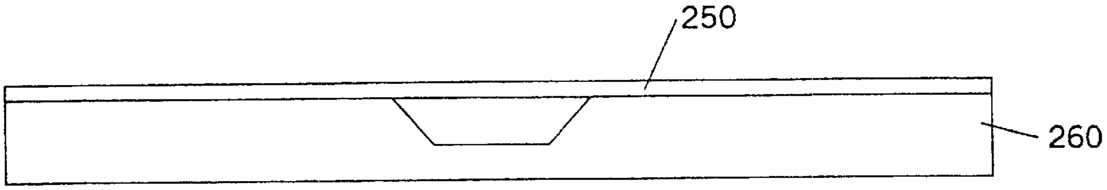
FIGS. 4A–4F are cross-sectional views illustrating an alternate sequence of operations performed during the fabrication of a MEMS device, such as a microrelay, according to yet another embodiment of the present invention.
Figure 4B:
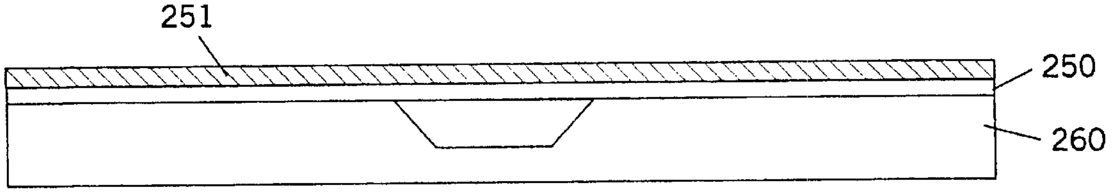
Figure 4C:
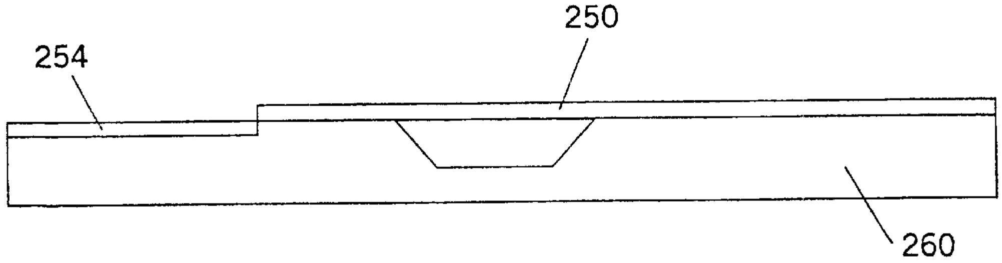
Figure 4D:
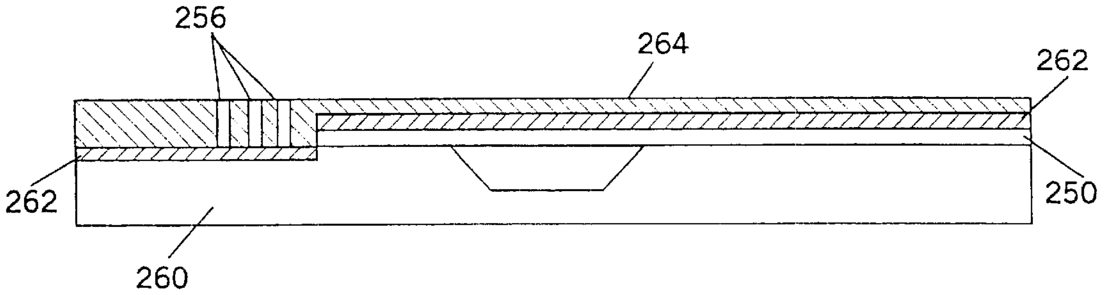
Figure 4E:
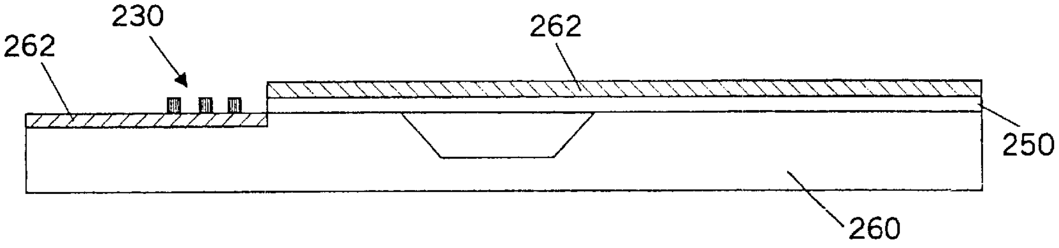
Figure 4F:
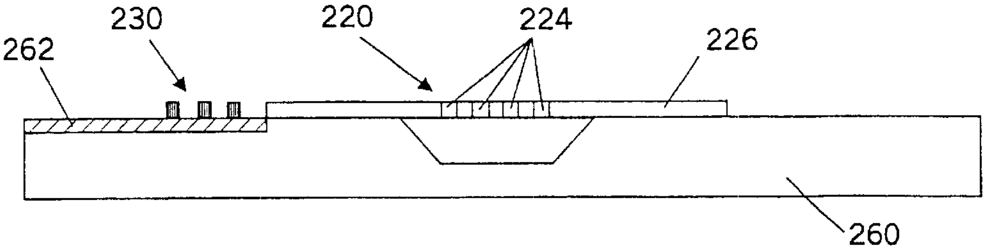

Once the metal 68 has been electroplated, the photoresist 64 is removed. Preferably, a cavity 63 is then formed in the substrate 60 through a predetermined opening in the plating base 62 using, for example, wet etching. The cavity 63 is positioned to underlie the arched beams 24 of the microactuator 20 in order to facilitate movement of the arched beams relative to the substrate while concurrently aiding in the thermal isolation of the arched beams from the substrate. The remaining plating base 62 may then also be removed so as to release a portion of the metallic structures 30 from the substrate 60 to produce, for instance, a moveable metallic structure 32. According to this embodiment of the present invention, the duration of the etch of the plating base 62 is preferably controlled, or a plating base 62 consisting of selective areas of chromium-copper-titanium is used, so that the portion of the plating base 62 underlying the metallic member and the tethers is removed without removing a significant portion of the plating base 62 that underlies the corresponding anchors. Thus, the metallic structure 30 remains anchored at either or both ends. Once the microactuator 20 and said at least one metallic structure 30 have been formed, the wafer 50 and the substrate 60 are bonded together by a low temperature bonding process, such as by a eutectic bonding or an anodic bonding process, as shown in FIG. 2D. As shown in FIG. 2E, the wafer 50 is then polished and etched to release the microactuator 20 and, in particular, the arched beams from the remainder of the wafer 50.

An alternative method of fabricating a MEMS device, such as a microrelay, according to the present invention is shown in FIG. 3. According to this method and as shown in FIG. 3A, a sacrificial plating base 162 is initially deposited upon a substrate 160. As described above, the substrate typically defines a cavity 163 that will underlie the silicon arched beams of the resulting microactuator. A wafer 150, such as a single crystalline silicon wafer, is then bonded to the substrate 160 by a low temperature bonding process such as, for example, a eutectic bonding or an anodic bonding process and the wafer 150 then polished to the desired thickness. As shown in FIG. 3B, a photoresist layer 152 is applied to the single crystalline silicon wafer 150 and patterned to form a number of windows 154 therethrough to the wafer 150. The areas of the wafer 150 within the windows 154 are then etched, such as by a deep reactive ion etch process, to further extend the windows 154 through the wafer 150 so as to expose the sacrificial plating base 162 on the substrate 160. According to this embodiment of the present invention, the wafer 150 thus advantageously comprises a plating template to facilitate the plating of the metallic components. As shown in FIG. 3C, a metal 168 is then electroplated within the windows 154 formed through the wafer 150 so as to fabricate the metal structures 130 corresponding, for example, to the contacts of the relay. Accordingly, the method of this embodiment is particularly advantageous since the single crystalline wafer 150 actually serves as a plating template, thereby precisely positioning the metallic components relative to the microactuator formed from the single crystalline wafer. Since the wafer 150 may be etched by a deep reactive ion etch process, windows 154 with aspect ratios on the order of 10:1 may be produced, thereby allowing high aspect ratio electroplating of the metal 168 and thus producing higher aspect ratios metal structures 130 than attainable with conventional photolithography processes. As shown in FIG. 3D, the wafer 150 is coated with a photoresist 170 and etched to form a microactuator structure 120 that is preferably disposed adjacent the previously created metallic structures 130. A portion of the wafer 150 surrounding the metallic structures 130 is then etched away such that the metallic structures 130 are freestanding on the substrate 160, as shown in FIG. 3E. As shown in FIG. 3F, the embodiment of the method also includes the appropriate etching steps, similar to those described above, to release the arched beams 124 and the metallic structures 130 from the underlying substrate to complete the microrelay 10.

A further alternative method of fabricating a MEMS device, such as a microrelay, in accordance with the present invention is shown in FIG. 4. As shown in FIG. 4A, a substrate 260, typically having a cavity as described above, is provided and has a single crystalline silicon wafer 250 disposed thereon and bonded thereto using, for example, a eutectic bonding process, an anodic bonding process, or a fusion bonding process. The wafer 250 is polished to the desired thickness before a photoresist 251 is applied to the wafer 250, as shown in FIG. 4B. Portions of the wafer 250 are then etched away to expose the substrate 260 and thereby define at least one window 254 in which said at least one metallic structure 230 is to be formed, as shown in FIG. 4C. If necessary, a plating base 262 is deposited within the window 254 before the window 254 is coated with a photoresist 264 that is subsequently patterned to define apertures 256 in the photoresist corresponding to said at least one metallic structure 230, as shown in FIG. 4D. At least one metallic structure 230 is then formed within the apertures 256 by an electroplating process in which a metal such as nickel is deposited within the apertures 256. As shown in FIG. 4E, the photoresist is then be removed such that only the metallic structures 230 remain.

In addition, either before or after forming the at least one metallic structure 230, the wafer 250 having the plating base 262 disposed thereon is coated with a photoresist (not shown). The photoresist is subsequently patterned and etched to form a microactuator structure 220 adjacent to and interoperable with said at least one metallic structure 230. Further, as described above and shown in FIG. 4F, this embodiment of the method also preferably includes etching steps to remove the excess plating base 262 on the wafer 250 and release the arched beams 224 and metallic structures 230 from the underlying substrate 260.

Figure 5:
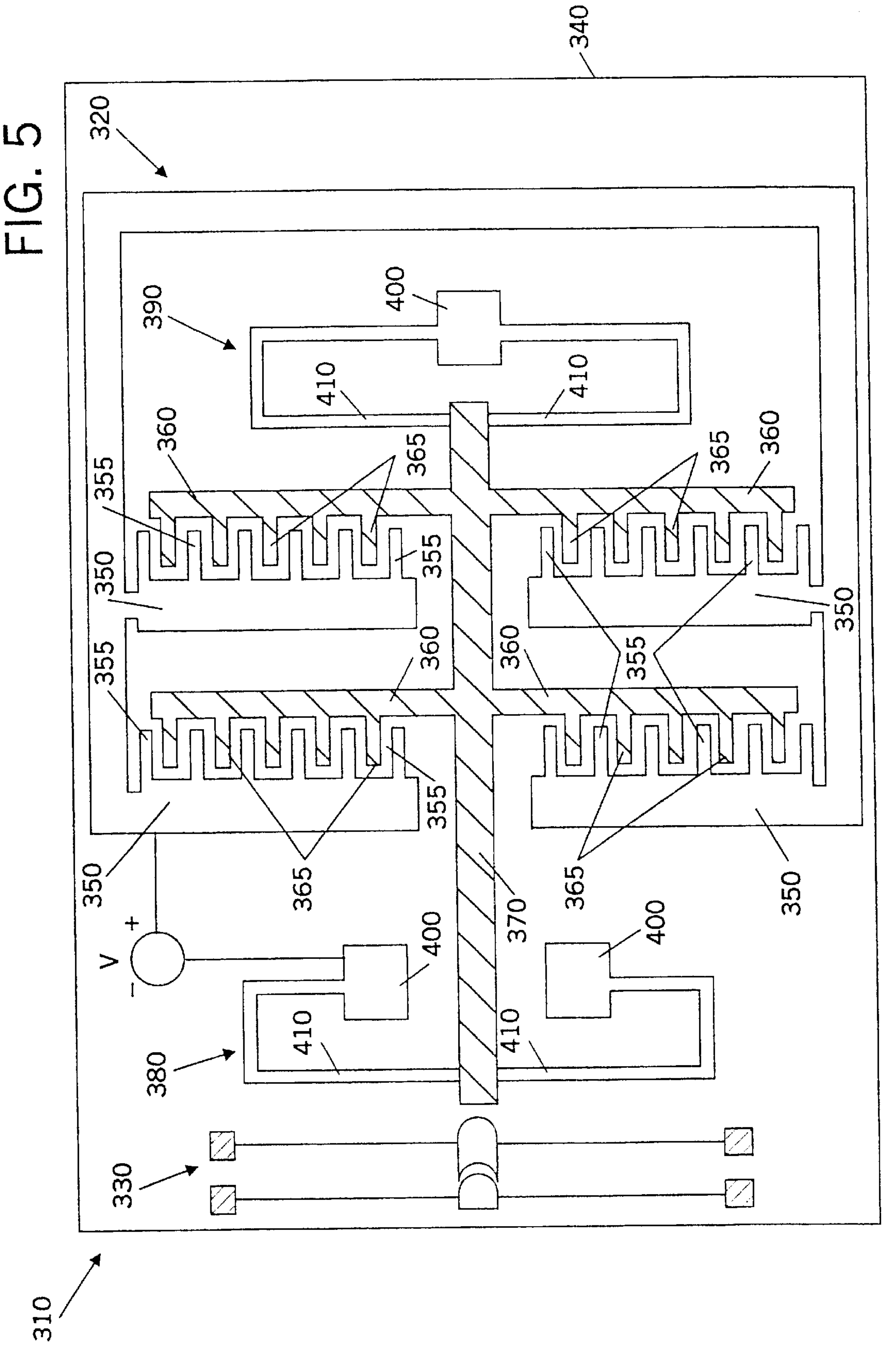
FIG. 5 is a plan view of an electrostatic microactuator in accordance with one embodiment of the present invention.

The MEMS device of the present invention can include other types of single crystalline microactuators in addition to thermally actuated microactuators. For example, still another advantageous aspect of the present invention is shown in FIG. 5 and comprises an electrostatic microactuator 320 as an alternate mechanism to a thermally actuated microactuator for actuating a MEMS device, such as a microrelay 310. The electrostatic microactuator 320 is preferably comprised of a single crystalline material, such as a single crystalline silicon, which is disposed on a substrate 340. As previously described, at least one metallic structure 330 is also disposed on the substrate 340 adjacent the microactuator 320 and on substantially the same plane with respect thereto. Further, the microactuator 320 is adapted to operably contact the at least one metallic structure 330 upon actuation thereof.

More particularly and according to one embodiment of the present invention, an electrostatic microactuator 320 as shown in FIG. 5 may comprise, for instance, a microelectronic substrate 340 having at least one stator 350 disposed thereon and anchored thereto. Each stator 350 has a plurality of fingers 355 protruding laterally therefrom. Further, the electrostatic microactuator 320 includes at least one shuttle 360 correspondingly disposed adjacent the at least one stator 350. Preferably, the shuttle 360 is movable with respect to the substrate 340 and has a plurality of fingers 365 protruding laterally therefrom and interdigitated with the fingers 355 protruding from the stator 350. An actuator member 370 is coupled to the at least one shuttle 360, protrudes outwardly therefrom toward the at least one metallic structure 330, and extends between a pair of spaced apart supports 380 and 390. Each support 380 and 390 includes at least one and, more typically, a pair of anchors 400 anchored to the substrate 340 and a spring member 410 coupled to each anchor 400. Each spring member 410 is movable with respect to the substrate 340 and is operably coupled to the actuator member 370.

In order to provide the necessary actuation of the microactuator 320, an electrical bias is applied between the at least one stator 350 and the at least one shuttle 360 such as, for instance, through electrodes (not shown) affixed to an anchor 400 and the stator 350. Application of an electrical bias, such as a voltage bias, between the stator 350 and the shuttle 360 produces electric fields of opposing polarity about the interdigitated fingers 355 and 365 and thereby cause the fingers 355 and 365 to attract each other. The attractive force produced by the applied voltage bias thus causes movement of the shuttle 360 toward the stator 350 such that the actuator member 370 operably engages one of the metallic structures 330, thereby closing the contacts of the microrelay 310 in response to the actuation of the electrostatic actuator 320. On removal of the voltage bias, the attractive force between the stator 350 and the shuttle 360 dissipates and the spring members 380 and 390 return the actuator member 370 to a rest position disengaged from the metallic structures 330, thereby opening the contacts of the microrelay 310.

MEMS devices that include microactuators other than thermally actuated microactuators can be fabricated according to the various fabrication methods set forth above in which the microactuator is formed of a single crystalline material, such as single crystalline silicon, while other components are formed of metal so as to lie in the same plane as the microactuator. For example, a MEMS device that includes an electrostatic microactuator as shown in FIG. 5 and described above can be fabricated according to the foregoing fabrication techniques. In this instance, the stator 350, the shuttle 360 and the spaced apart supports 380, 390 of the electrostatic microactuator would preferably be formed of a single crystalline material in the same fashion as the spaced apart supports 22, the actuator member 26 and the arched beams 24 of a thermally actuated microactuator 20 are formed of a single crystalline material in the embodiments of the methods described above. In addition, the metallic components 330 of the electrostatically actuated MEMS device can be formed, such as by electroplating, as also described above so as to lie in the same plane as the electrostatic microactuator.

Thus, a MEMS device, such as a microrelay, can be formed in accordance with the present invention that includes a microactuator formed of single crystalline silicon, while other components of the MEMS device are formed of metal, such as nickel, disposed on a substrate adjacent the microactuator and on substantially the same plane therewith. Fabricating features and/or components of the microactuator from single crystalline silicon allows the features and/or components to be formed with aspect ratios of up to at least 10:1, particularly by using a deep reactive ion etching process. The higher aspect ratios of the components increases their out-of-plane stiffness and constructs a more robust device. The fabrication techniques of the present invention also permits features and/or components to be more closely spaced. The closer spacing, for example, between adjacent silicon arched beams in a thermally actuated microactuator, results in more effective transfer of heat between adjacent arched beams. In addition, the single crystalline silicon microactuator in a thermally actuated microactuator can be directly heated, such as by passing a current therethrough, which is generally more efficient than indirect heating. Further, although the coefficient of thermal expansion of silicon is less than that of metals, such as nickel, silicon is significantly less dense than nickel such that for a given amount of power a silicon arched beam can generally be heated more than a corresponding nickel arched beam. Therefore, the MEMS device of the present invention can have greater out-of-plane stiffness, can be more robust and can be more efficiently heated than conventional MEMS microactuators having metallic arched beams.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A microelectromechanical device comprising:

a microelectronic substrate;

a thermally actuated microactuator disposed on said substrate and comprised of a single crystalline material; and at least one metallic structure disposed on said substrate and spaced from said microactuator, wherein said microactuator is adapted to operably contact said at least one metallic structure in response to thermal actuation thereof.

2. A microelectromechanical device according to claim 1 wherein said at least one metallic structure comprises two metallic structures displaced from each other along an axis of movement of the microactuator.

3. A microelectromechanical device according to claim 1 wherein the microactuator further comprises:

spaced apart supports disposed on said substrate;

at least one arched beam extending between said spaced apart supports;

an actuator member operably coupled to said at least one arched beam and extending outwardly therefrom; and means for heating said at least one arched beam to cause further arching thereof such that said actuator member moves between a first position in which said actuator member is spaced apart from said at least one metallic structure and a second position in which said actuator member operably engages said at least one metallic structure.

4. A microelectromechanical device according to claim 3 wherein said microactuator comprises a plurality of arched beams coupled together by the actuator member and extending between the spaced apart supports in substantially parallel alignment.

5. A microelectromechanical device according to claim 1 wherein said microactuator is thermally activated by internal heating thereof.

6. A microelectromechanical device according to claim 1 wherein said microactuator is thermally activated by external heating thereof.

7. A microelectromechanical device according to claim 1 wherein said microactuator is comprised of single crystal silicon.

8. A microelectromechanical device according to claim 1 wherein said at least one metallic structure is comprised at least one of nickel and gold.

9. A microelectromechanical device comprising:

a microelectronic substrate;

a microactuator disposed on said substrate and comprised of a single crystalline material, said microactuator being at least one of a thermally actuated microactuator and an electrostatic microactuator; and at least one metallic structure disposed on said substrate adjacent said microactuator and on substantially the same plane, wherein said microactuator is adapted to operably contact said at least one metallic structure in response to actuation thereof.

10. A microelectromechanical device according to claim 9 wherein the microactuator further comprises:

spaced apart supports disposed on said substrate;

at least one arched beam extending between said spaced apart supports;

an actuator member operably coupled to said at least one arched beam and extending outwardly therefrom; and means for heating said at least one arched beam to cause further arching thereof such that said actuator member moves between a first position in which said actuator member is spaced apart from said at least one metallic structure and a second position in which said actuator member operably engages said at least one metallic structure.

11. A microelectromechanical device according to claim 9 wherein said microactuator is comprised of single crystalline silicon.

12. A micro electromechanical device according to claim 9 wherein said at least one metallic structure is comprised at least one of nickel and gold.

13. A microelectromechanical device according to claim 9 wherein the microactuator is configured to move between an actuated and unactuated position substantially within the plane of the microactuator and the at least one metallic structure.

14. A microelectromechanical device according to claim 9 wherein the microactuator is thermally activated by at least one of external or internal heating thereof.

* * * * *